UNITED STATES PATENT OFFICE.

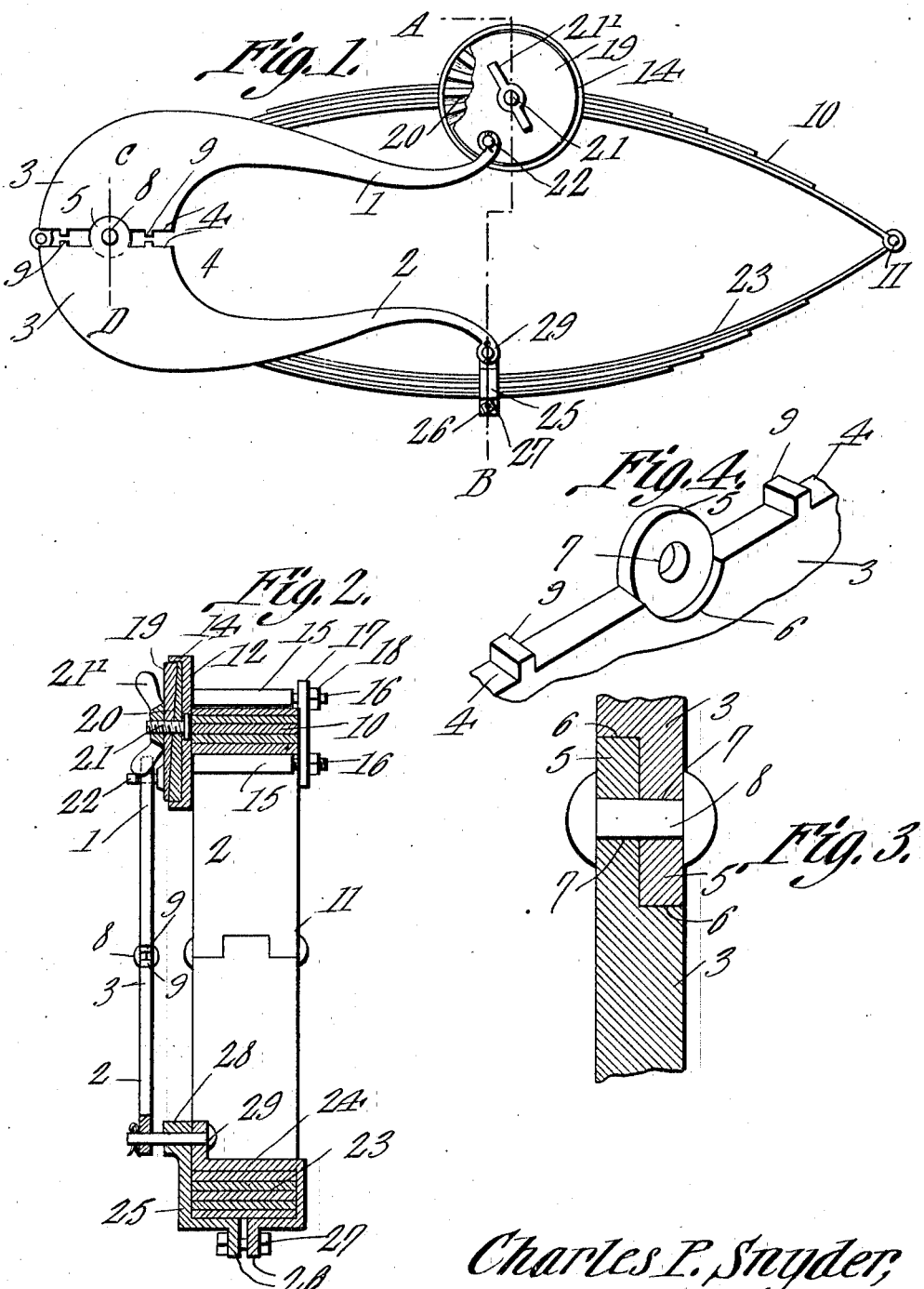

CHARLES P. SNYDER, OF MOUNT CARMEL, PENNSYLVANIA.

SHOCK-ABSORBER.

1,059,402.  Specification of Letters Patent.  Patented Apr. 22, 1913.

Application filed December 6, 1911. Serial No. 664,276.

*To all whom it may concern:*

Be it known that I, CHARLES P. SNYDER, a citizen of the United States, residing at Mount Carmel, in the county of Northumberland and State of Pennsylvania, have invented a new and useful Shock-Absorber, of which the following is a specification.

The present invention aims to provide a shock absorber for a vehicle, the shock absorber consisting of a pair of spring arms, the free ends of which are adapted for connection with the spring of a vehicle, the other ends of the spring arms being pivotally connected in their intermediate portions, the pivotally connected end faces of the arms being spaced apart, so that the vehicle spring may yield, without putting the spring arms under tension. When, however, the vehicle spring yields unduly, the pivotally connected end faces of the arms will come into contact, upon one side or the other of the pivotal connection, thereby putting the spring arms under tension, when the vehicle spring is compressed, or expands, unduly.

A further object of the invention is to provide a device for connecting one of the spring arms with the spring of the vehicle, adjustably, whereby to space the pivotally connected end faces of the arms.

A further object of the invention is to provide, as an article of manufacture, a novel form of spring arm, adapted to be employed in the fashioning of shock absorbers.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows in side elevation, a vehicle spring to which the shock absorber constituting the subject-matter of the present invention, has been applied, a part of the means for connecting the shock absorber with the vehicle spring being broken away; Fig. 2 is a transverse section upon the line A—B of Fig. 1, parts appearing in elevation; Fig. 3 is a transverse section on the line C—D of Fig. 1; and Fig. 4 is a fragmental perspective of one of the spring arms, the view depicting those elements whereby the spring arms are pivotally connected.

In carrying out the invention there is provided a pair of tapered spring arms 1 and 2, these arms being duplicates, the arms terminating in enlarged heads 3, the end faces 4 of which are normally parallel and spaced apart, the end faces 4 extending in the same general direction as the arms 1 and 2. Upstanding from the end face 4 is a lug 5, the end of which is circular, and adapted to fit in a curved recess 6, formed at the base of the lug 5 of the mating spring arm. In the lugs 5 there are openings 7, adapted to receive the pivot element 8, whereby the heads 3 of the arms 1 and 2 may be connected. Outstanding from the end faces 4, upon both sides of the lugs 5, are transverse ribs 9. These ribs 9 may, for convenience in description, be considered as parts of the end faces 4. The ribs 4 upon the spring arm 2 are normally spaced apart from the ribs 9 upon the spring arm 1, as Fig. 1 will render evident.

A mechanism is provided for adjustably connecting the spring arm 1, at the free end, with the upper part 10 of the vehicle spring 11. This mechanism preferably consists of a primary disk 12 having an outstanding flange 14, there being studs 15 projecting rearwardly from the primary disk 12, the studs 15 being adapted to include between them, the upper part 10 of the vehicle spring. The studs 15 are equipped with threaded ends 16, which project through a plate 17, applied against the rear face of the part 10 of the vehicle spring, the threaded ends being adapted to receive nuts 18, whereby the primary disk 12 may be bound against the upper part 10 of the vehicle spring.

Journaled for rotation within the flange 14 of the primary disk 12, is a secondary disk 19, there being interlocking radial ribs 20 upon the adjacent faces of the disks 12 and 19. A bolt 21 extends through the disks 12 and 19, and upon the outer end of the bolt 21 is threaded a wing nut 21' which, engaging the secondary disk 19, serves to hold the radial ribs 20 in engagement. A stud 22 outstands from the secondary disk 19, and with this stud 22, the free end of the spring arm 1 is pivotally connected.

The spring arm 2 may be connected with a support of any sort. In the present instance, the spring arm 2 is shown as being connected with the lower part 23 of the vehicle spring 11. A clamp of any desired sort may be utilized for connecting the free end of the spring arm 2 with the lower part 23 of the vehicle spring 11. In the present instance, although not necessarily, this clamp consists of upper and lower members 24 and 25, respectively, the member 24 extending across the top of the part 23, downwardly across the rear edge of the part 23, and partway across the bottom of the element 23, as clearly shown in Fig. 2. The member 25 extends across the forward face of the part 23, and partway across the bottom of the element 23. The members 24 and 25 at their lower ends terminate in ears 26, through which may pass a connecting bolt 27. At their upper ends, the members 24 and 25 terminate in mating flanges 28, through which may be passed a pivot bolt 29, receiving pivotally, the free end of the spring arm 2.

In practical operation, the ribs 9 of the heads 3 are normally spaced apart, as clearly shown in Fig. 1, the ribs 9 being considered as parts of the end faces 4. Owing to the fact that the ends 9 are spaced apart, the vehicle spring 11 may yield, under normal conditions, without bringing the ribs 9 into engagement upon either side of the pivot element 8. When, however, the vehicle spring 11 is compressed unduly, the ribs 9 will come into contact upon the right hand side of the pivot element 8, in Fig. 1, the spring arms 1 and 2 being thereupon put under tension. When the parts 10 and 23 of the vehicle spring 11 are separated suddenly, as frequently happens, after an undue compression, the ribs 9 come into contact upon the left hand side of the pivot element 8 in Fig. 1, thereby putting the spring arms 1 and 2 under tension. Thus, the shock absorber will be rendered effective to relieve undue tension upon the vehicle spring 11, whether such tension results from an undue compression of the vehicle spring, or an undue expansion of the vehicle spring. However, owing to the fact that the ribs 9 are normally spaced apart, under ordinary working conditions of the vehicle spring 11, the shock absorber will not be under tension continually.

In order that the ribs 9 may be spaced apart under working conditions, an adjustment must be effected between the spring arms 1 and 2. This adjustment may be brought about by loosening the wing nut 21' and by rotating the secondary disk 19 with respect to the primary disk 12, the interfitting ribs 20 serving to hold the disks in their adjusted positions.

Having thus described the invention, what is claimed is:—

1. A shock absorber comprising spring arms having spaced end faces adapted to come into contact at both extremities; means for pivotally connecting the arms intermediate the extremities of the end faces; attaching means upon the free end of one arm; a movable member pivoted to the free end of the other arm; attaching means supporting the movable member for pivotal movement whereby when the movable member is operated, the space between the extremities of the end faces may be adjusted; and mechanism for holding the movable member against movement, thereby to retain the extremities of the end faces of the spring arms in adjusted relation.

2. A shock absorber comprising spring arms having enlarged end faces adapted to come into contact successively at both extremities; means for pivotally connecting the arms intermediate the extremities of the end faces; means for attaching the free end of one arm to a vehicle spring; a primary disk eccentrically pivoted to the free end of the other arm; a secondary disk; means for securing the secondary disk to a vehicle spring; a clamp connecting the disks; and interengaging elements upon the adjacent faces of the disks.

In testimony that I claim the foregoing as my own, I have hereto affixed my signature in the presence of two witnesses.

CHARLES P. SNYDER.

Witnesses:
 E. M. WILLIAMS,
 JAMES A. HIGHORNE.

---

Copies of this patent may be obtained for five cents each, by addressing the "Commissioner of Patents, Washington, D. C."